J. DOHT AND H. H. BARTELT.
TOY VEHICLE.
APPLICATION FILED SEPT. 20, 1919.
1,367,771.
Patented Feb. 8, 1921.
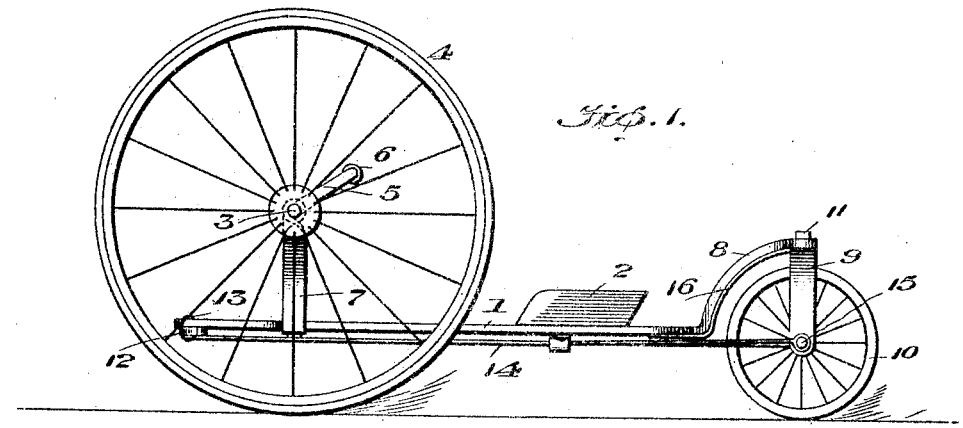
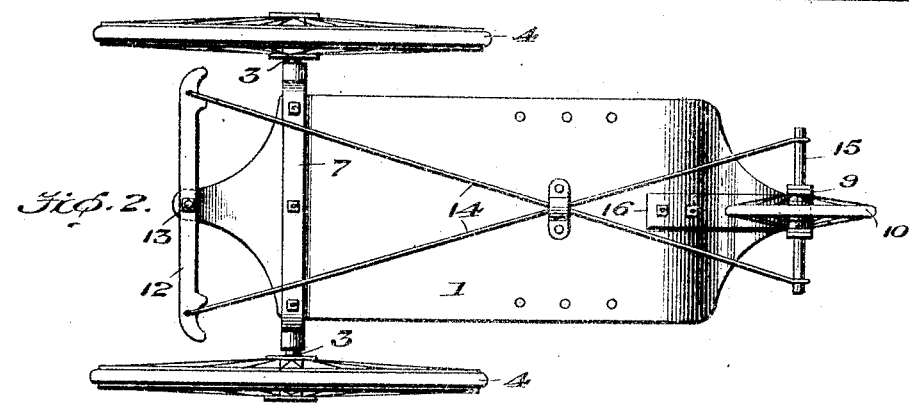
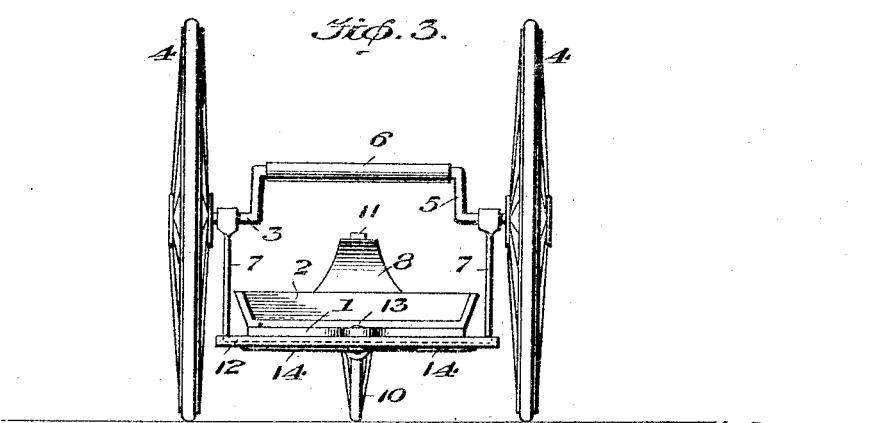
Inventors
John Doht
Henry H. Bartelt
By Vernon E. Hodges
Their Attorney
Witness

UNITED STATES PATENT OFFICE.

JOHN DOHT AND HENRY H. BARTELT, OF QUINCY, ILLINOIS.

TOY VEHICLE.

1,367,771.   Specification of Letters Patent.   Patented Feb. 8, 1921.

Application filed September 20, 1919. Serial No. 325,069.

*To all whom it may concern:*

Be it known that we, JOHN DOHT and HENRY H. BARTELT, citizens of the United States, residing at Quincy, in the county of Adams and State of Illinois, have invented certain new and useful Improvements in Toy Vehicles, of which the following is a specification.

Our invention relates to an improvement in toy vehicles. The object is to provide a simple, light-running car of diminutive size for children, adapted to be propelled preferably by the hands and steered by the feet, one of the advantages being that it provides amusement and at the same time perfect safety to the rider, and can be propelled by the rider, or pulled or pushed conveniently, when desired.

With these objects in view, this invention consists in a body having a seat, two main propeller-wheels, a U-shaped axle, the outer ends of which are supported and secured in the hubs of said wheels, the center of the axle being in the form of a crank which serves as a means of propulsion for the vehicle, a U-shaped hanger loosely suspended on the ends of the axle and supporting the forward end of the body, a steering-wheel swiveled at the rear end, and means within the control of the rider for turning the steering-wheel to the right or left to steer the vehicle.

In the accompanying drawings:

Figure 1 is a view in side elevation;

Fig. 2 is a bottom plan view;

Fig. 3 is a front view.

The numeral 1 represents the body of the vehicle, and 2 is a seat secured thereon.

The numeral 3 represents a U-shaped axle, the ends of which are secured in the hubs of the propeller-wheels 4, and the center of which axle forms a crank 5 having a sleeve 6 thereon, which is grasped in the hand or hands of the rider, whereby it is used as a means of propulsion of the vehicle.

A U-shaped hanger 7 is suspended on the ends of the axle just within the wheels 4 and extends beneath the forward end of the body to which it is secured, forming a support for the forward end of the latter.

The rear end of the body terminates in the form of a goose-neck 8, and the frame 9 of the steering-wheel 10 is pivotally secured thereto by king-bolt 11.

A foot-lever 12 is pivoted at the center to the extreme forward end of the body by a bolt 13, and the steering rods or cables 14 extend from the outer end of this foot-lever 12 beneath the body, where they cross and extend to the outer end of the arm 15 secured to the frame 9 of the steering-wheel, as shown in Fig. 2.

A brace 16 is bolted at the rear end of the bottom of the body, and extends beneath the goose-neck 8 to reinforce the latter.

From the foregoing, it will be seen that a simple, light and compact caster is formed by this combination, which is easy for a child to propel and steer, and, by reason of the length of the body between supports, it is comfortable, as it has the effect of a buckboard. Furthermore, the propeller-wheels are large, and the axle gives the required leverage, making it easy to propel, and providing a fast-running axis when used as such.

We claim:—

A vehicle which includes a straight flat body portion having a seat thereon, an axle, wheels secured to the ends of the axle, a U-shaped hanger suspended from the ends of the axle near the wheels upon which the front end of the body is supported, the rear end of the body terminating in a goose-neck, a steering wheel frame pivotally connected to the latter and having a wheel journaled therein, the axle of the wheel being approximately in alinement with the lower surface of the body portion, a foot lever pivoted at its center to the forward end of the body portion, and steering rods or cables crossed beneath the body portion and extending from the outer ends of the foot lever to the outer ends of the axle of the steering wheel, said foot-lever and steering rods being in substantially horizontal alinement with the axle of said steering-wheel.

In testimony whereof we affix our signatures.

JOHN DOHT.
HENRY H. BARTELT.